United States Patent
Tiburski Junior

(10) Patent No.: US 11,303,182 B2
(45) Date of Patent: Apr. 12, 2022

(54) INTERNAL PRESSURE REDUCTION DEVICE AND EXPLOSION-PROOF ELECTRIC MACHINE

(71) Applicant: WEG EQUIPAMENTOS ELÉTRICOS S.A., Jaraguá do Sul (BR)

(72) Inventor: Eliseu Tiburski Junior, Jaraguá do Sul (BR)

(73) Assignee: WEG EQUIPAMENTOS ELÉTRICOS S.A., Jaraguá do Sul (BR)

( * ) Notice: Subject to any disclaimer, the term of this patent is extended or adjusted under 35 U.S.C. 154(b) by 157 days.

(21) Appl. No.: 16/761,442

(22) PCT Filed: Nov. 3, 2017

(86) PCT No.: PCT/BR2017/050331
§ 371 (c)(1),
(2) Date: May 4, 2020

(87) PCT Pub. No.: WO2019/084636
PCT Pub. Date: May 9, 2019

(65) Prior Publication Data
US 2020/0395810 A1    Dec. 17, 2020

(51) Int. Cl.
*H02K 5/22* (2006.01)
*H02K 5/136* (2006.01)
*H02K 15/14* (2006.01)

(52) U.S. Cl.
CPC ............... *H02K 5/136* (2013.01); *H02K 5/22* (2013.01); *H02K 15/14* (2013.01)

(58) Field of Classification Search
CPC  H02K 5/00; H02K 5/13; H02K 5/136; H02K 5/22; H02K 15/00; H02K 15/14; H05K 7/14; H05K 7/146; H05K 7/1462; G01F 15/14; G01D 11/24
See application file for complete search history.

(56) References Cited

U.S. PATENT DOCUMENTS

| | | | | |
|---|---|---|---|---|
| 4,223,364 A | * | 9/1980 | Sangster | ............... H02H 5/06 200/81.5 |
| 2012/0198931 A1 | * | 8/2012 | Schulze | ............... G01F 15/14 73/431 |

* cited by examiner

*Primary Examiner* — Tran N Nguyen
(74) *Attorney, Agent, or Firm* — B. Aaron Schulman, Esq.; Stites & Harbison, PLLC

(57) ABSTRACT

An explosion-proof electrical machine and, more specifically, to an electrical machine comprising an internal pressure reduction device. The internal pressure reduction device comprises a base for installation in a region of the casing below the connection box, a base being configured to receive a plurality of volume filling pieces; wherein the base comprises a bottom part and a part of wall which is extended by at least a part of the periphery of the bottom part. The base may further comprise at least one engaging means for each piece of the plurality of volume filling pieces.

11 Claims, 9 Drawing Sheets

(a)

(b)

(a)

(b)

(a)

(b)

(a)

(b)

INTERNAL PRESSURE REDUCTION DEVICE AND EXPLOSION-PROOF ELECTRIC MACHINE

FIELD OF THE INVENTION

The present invention relates to an explosion-proof electric machine and, more specifically, to an electric machine comprising an internal pressure reduction device.

BACKGROUND OF THE INVENTION

Electric rotating machines are widely known in the art and basically comprise a static part (stator) and a rotating part (rotor). In a simplified way, the stator is formed by a grooved magnetic core where windings or coils are accommodated, and the rotor comprises a grooved magnetic core that can be filled with windings or coils, or filled by liquid-phase metal and, then, solidified. This compounds being mounted on an axis, giving rise to the rotor.

Those skilled in the art know that rotating electrical machines are vulnerable to the heating of the components and can occasionally generate sparks.

Electric engines that can operate in environments with the presence of explosive gases, are subject to cause ignition of this explosive atmosphere. For the explosion proof engines, the engine is built with the ability to withstand possible explosions that occur in the interior of the engine, without the spread to the external environment.

The combustion process causes an expansion of the gases and, when it occurs inside the machine, it tends to increase the internal pressure, increasing the efforts on the components that make up the engine casing.

Explosive atmospheres are those that present, in addition to oxygen, a proportion of gas, steam, dust or fibers, where a spark from an electrical circuit or the heating of equipment can be a source of ignition or cause an explosion. That kind of atmosphere is found, for example, in industries of the petrochemical, food, pharmaceutical, paper and textile fields.

A known way to reduce the risks associated with electrical machines is to confine the parts that can cause an explosive atmosphere to ignite in a casing capable of withstanding the pressure generated by the internal explosion allowing the gas resulting from the explosion to escape to the outside the casing through the interstices with controlled gaps (flame passages), in order to reduce the energy of the ignition preventing gas from the external environment to the engine.

Those skilled in the art know that the passage of a gas through a region with reduced gap, offers head loss and, consequently, there is a reduction in the energy of the gas.

During the explosion process there is an abrupt increase in the internal pressure of the engine. Thus, the thickness of the casing is increased, in order to make it able to withstand the mechanical stresses arising from this explosion process. It turns out that the increase in the thickness of the casing causes an increase in mass and volume in the rotating electric machine, and, consequently, operating restrictions and cost increase.

In addition, the design of safe engines for operation in explosive atmospheres also requires testing, in order to ensure that the elements that make up the enclosure are able to withstand the occurrence of an explosion.

As known by the skilled in the art, the combustion process has a direct influence on the geometry of the chamber. In cases wherein we have two volumes that are separated by a reduced channel, a significant increase in the explosion pressure of the second chamber is expected due to the pre-compression of the gases.

In this regard, tests carried out by the inventors have shown that a particularly critical area of the casing of a rotating machine is that located below the connection box.

As known to those skilled in the art, connection boxes are connected to the casing to house the electrical cable connections to the machine. Generally, the connection boxes are positioned as required in the design and fixed to the machine frame by means of screws.

There are in the prior art some solutions that aim to provide reinforcements and fixing walls in the region of the connection box in the electrical machine casing, however, as will be shown below, none of the known solutions deals directly with the region as a critical region of internal pressure buildup.

The North American document U.S. Pat. No. 1,799,071, for example, shows a dynamo-electric machine where the connection box is arranged in a conical nipple through which conductors pass, and an incombustible substance is provided to surround the conductors and seal the passage between the casing and the connection box.

The German document DE 102009013049 shows an electric motor having a connection box mounted on a fixing means with a cylindrical opening with an axis perpendicular to that of the motor, with an elastic body being inserted just in the cylindrical opening. The elastic body is compressed by an element with external thread, which engages a threaded portion of the cylindrical cover. This construction forms two separate areas for the terminal box and the enclosure, but allows the cables from the terminal box to pass through the casing.

US 2014/0265682 shows an explosion-proof engine that includes an adapter plate where a sealing compound is injected which, after cured, forms an explosion-proof seal.

The solutions discussed above are based on structural reinforcements, that is, on reinforcements and seals that seek to define, reinforce or isolate the environment that must resist the explosion.

Although the structural reinforcing character of known solutions can be useful in some explosion-proof casing constructions, there are disadvantages associated with the high cost and low versatility of such solutions.

Indeed, the solutions that involve the injection or dump curable resins requires one method of assembly with steps of injection and cure, the increasing the amount of time assembly.

Moreover, since the solidified sealing material remains adhered to the structure, this type of solution makes maintenance of the machine more difficult.

Another disadvantage associated with the permanent character of the known solutions is the fact that the seals and reinforcements prevent the rotation of the connection box in relation to the machine casing, which reduces the installation versatility.

OBJECTIVES OF THE INVENTION

Thus, it is one of the objectives of the present invention to provide an internal pressure reduction device for an electrical machine, which presents a simple construction, but with great versatility of use. It is another objective of the present invention to provide an internal pressure reduction device with easy and simple installation in the electrical machine.

It is another objective of the present invention to provide an internal pressure reduction device that can be removed and reinserted in the electric machine without difficulties, facilitating maintenance.

It is another object of the present invention to provide an internal pressure reduction device that allows its use regardless of the rotation position of the electrical machine's connection box.

It is yet another objective of the present invention to provide an explosion-proof electric machine with an internal pressure reduction device, which decreases the internal pressure of the machine in the most critical region.

BRIEF DESCRIPTION OF THE INVENTION

The present invention achieves the above objectives by means of an internal pressure reducing device for installation in an explosion-proof electrical machine of the type comprising a casing and a connection box attached to the casing. The device comprises a base for installation in a region of the casing below the connection box, the base being configured to receive a plurality of volume filling pieces; wherein the base comprises a bottom part and a wall part that extends over at least a part of the periphery of the bottom part.

The base may also comprise at least one engaging means for each piece of the plurality of volume filling pieces.

In the preferred embodiment of the present invention, it is the bottom wall of the base that comprises at least one engaging means; and each volume filling piece has at least one locking means configured to lock with the corresponding locking means of the base.

The base can be made of polymeric material, such as silicone or plastic, or of metallic material, such as aluminum or cast iron.

Preferably, the amount of volume filling pieces are identical, and each filling piece can be made of polymeric material such as silicone or plastic, or metallic material such as aluminum or iron casting.

The engaging means of the bottom part preferably comprises at least one elongate projection and the engaging means of each filling part preferably comprises at least one oblong opening that receives the elongated projection in engaging set.

Each filling piece can also have a recess with a stop shoulder in the machine frame.

The bottom wall of the base may further comprise an external engaging shoulder which cooperates with one recess in the casing of the electrical machine, and at least one passage track for passage of cables and connecting electric wire.

The present invention also relates to an explosion-proof electric machine of the type comprising a casing and a connection box attached to the casing, so that a region of the casing is defined below the connection box. The casing region below the connection box is configured to receive the pressure reducing device of the present invention.

BRIEF DESCRIPTION OF THE DRAWINGS

The present invention will be described in more detail below, with reference to the accompanying drawings, in which.

DETAILED DESCRIPTION OF THE INVENTION

The present invention will be described below on the basis of a preferred embodiment shown in FIGS. 1 to 12.

Figure 1:
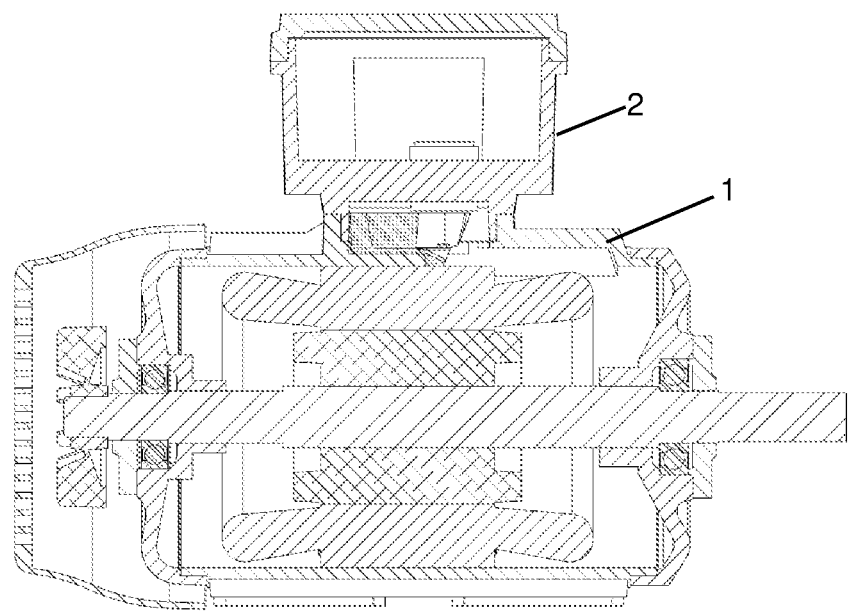
FIG. 1—is a cross-sectional view of an electric rotating machine according to a preferred embodiment of the present invention.
Figure 2:
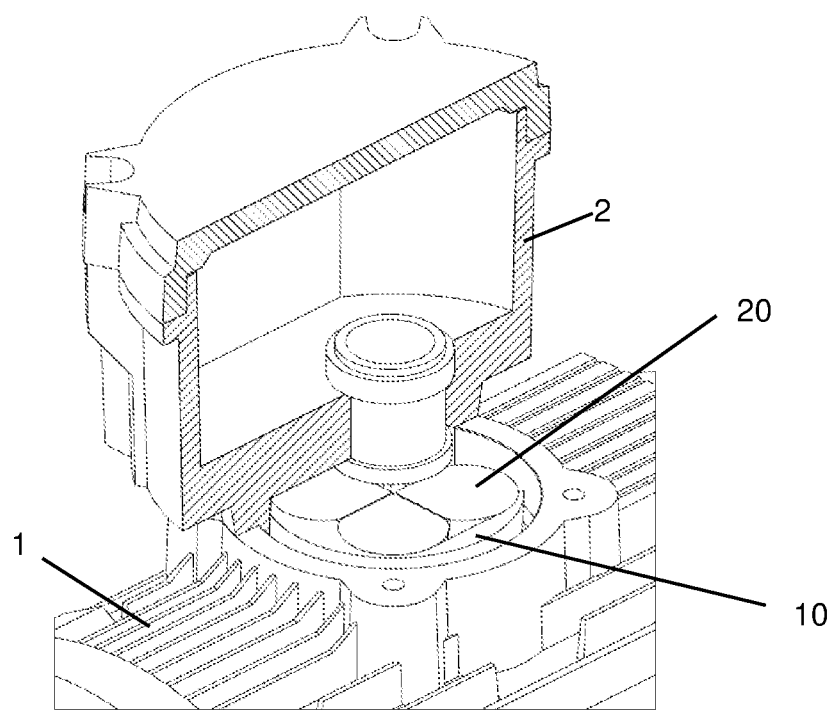
FIG. 2—is a perspective view of a top portion of one machine power from accordance with one embodiment preferred of the present invention where the connection box is shown in sectional configuration.
Figure 3:
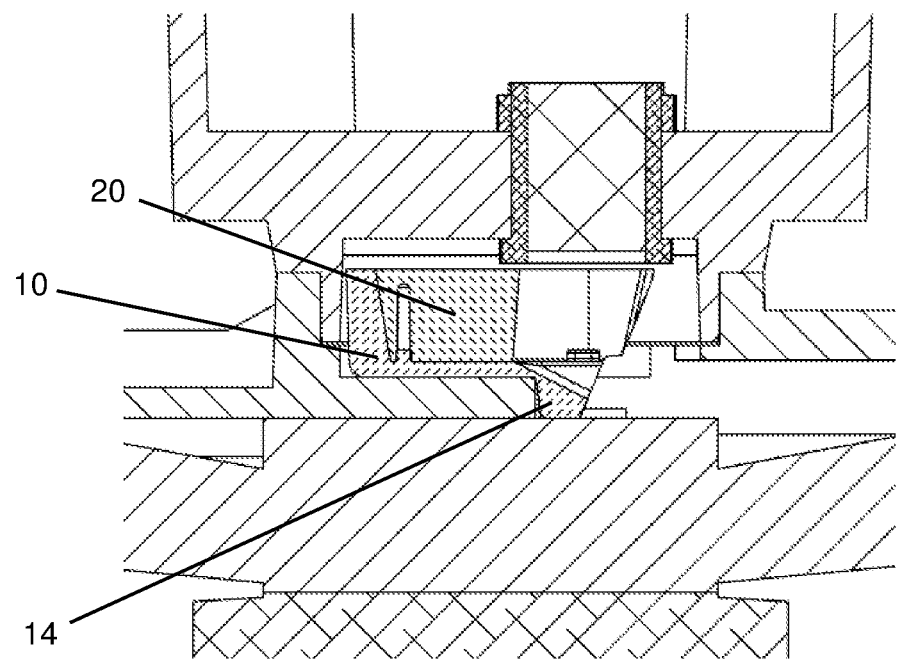
FIG. 3—is a detailed cross-sectional view of the portion below the connection box of the electric machine according to a preferred embodiment of the present invention.

FIG. 1 shows a sectional view of an electric machine according to a preferred embodiment of the present invention.

The machine 1 comprises a casing in which is fixed a connection box 2. As known by those skilled in the art, the connection box 2 generally comprises one box with a lid whose body is configured to allow the passage and connection of electrical cables.

Internal explosion tests performed by the inventors have shown that the region below the connection box is the most critical one since it posterior regions to one decrease abruptly of area tend to exhibit high internal pressure values due to the phenomenon of recompression.

Thus, the present invention has as one of its objectives the reduction of pressure in the area below the connection box by filling the empty volume in that region.

Thus, in a preferred embodiment shown in FIGS. 1 to 13, the internal pressure reduction device of the present invention comprises one base 10 configured to receive one plurality of volume filling pieces 20.

The base 10 and the volume filling pieces 20 are preferably produced in polymeric material. In a preferred embodiment, the polymeric material is silicone. However, other polymeric or metallic materials could be used.

Depending on the design of the electrical machine and the need for space for passing wires and cables to the terminal box, the device may comprise a different number of volume filling pieces 20. When the space requirement is greatest, the device can be installed only with the base 10 as filling of volume. That is, in a device configuration of the present invention, the base 10 is used without the volume filling pieces. This device embodiment is shown in FIGS. 12a and 12b.

Figure 4:
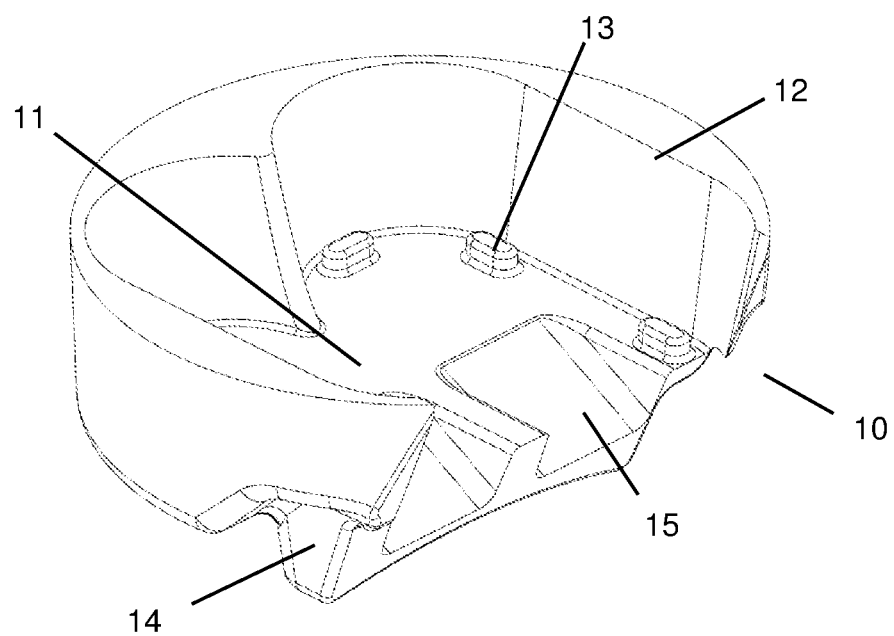
FIG. 4—is a top perspective view of the base of the internal pressure reducing device according to a preferred embodiment of the present invention.

As best shown in FIG. 4, the base 10 comprises one bottom part 11 and one part of the wall 12. Preferably, the part of wall 12 extends from the periphery of the bottom part 11 of base 10, except for an access part where the wall part is not present.

In the preferred embodiment of the present invention, the bottom part 11 comprises at least one engaging means 13 for each volume filling piece 20, each volume filling piece 20 having a corresponding engaging means 21.

Preferably, the engaging means 13 of the bottom part 11 comprises at least one elongated projection 13 and the engaging means 21 of the filler piece comprises at least one oblong opening 21 which receives, in engaging configuration, the oblong opening 13. The oblong openings 21 of the volume filling pieces 20 can be best seen in FIG. 7.

Naturally, the opening and projection could have any other shape, as long as they allow an engagement between them. Likewise, the engaging means 13 of the bottom part 11 could comprise an opening, while the engagement means 21 of the volume filling piece 20 could comprise a projection opening, without altering the principle of operation of the engagement between the parts.

Figure 6:
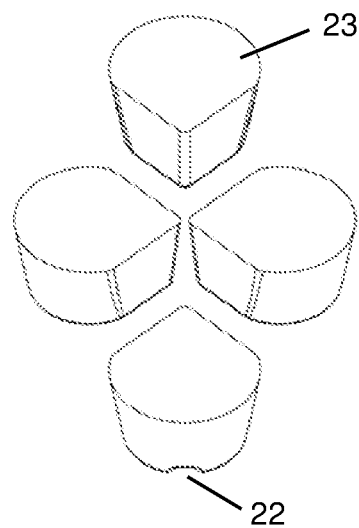
FIG. 6—is a perspective view of the filling elements of the internal pressure reducing device according to a preferred embodiment of the present invention.
Figure 7:
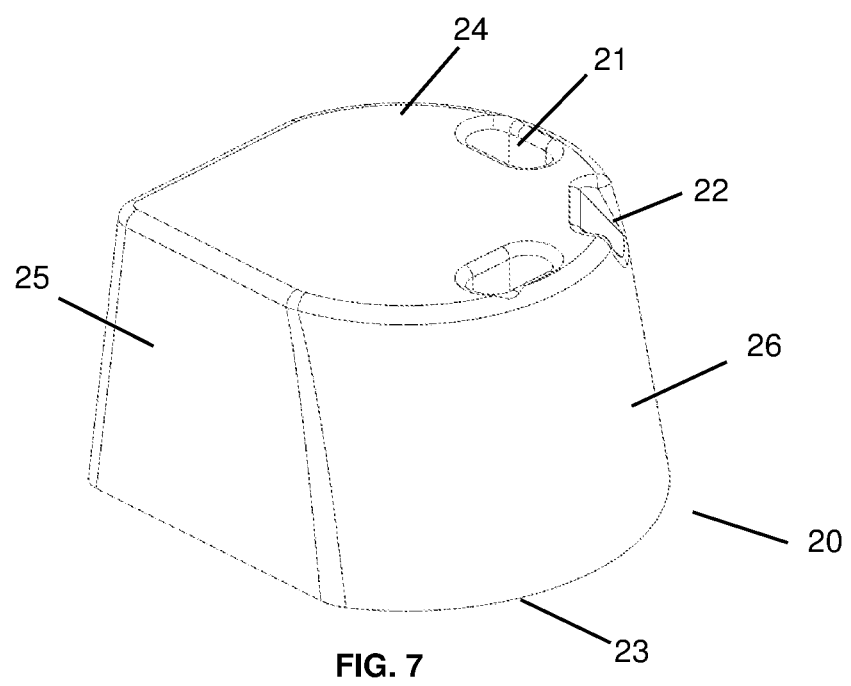
FIG. 7—is a bottom perspective view of one of the filling elements of the internal pressure reduction according to a preferred embodiment of the present invention.
Figure 8:
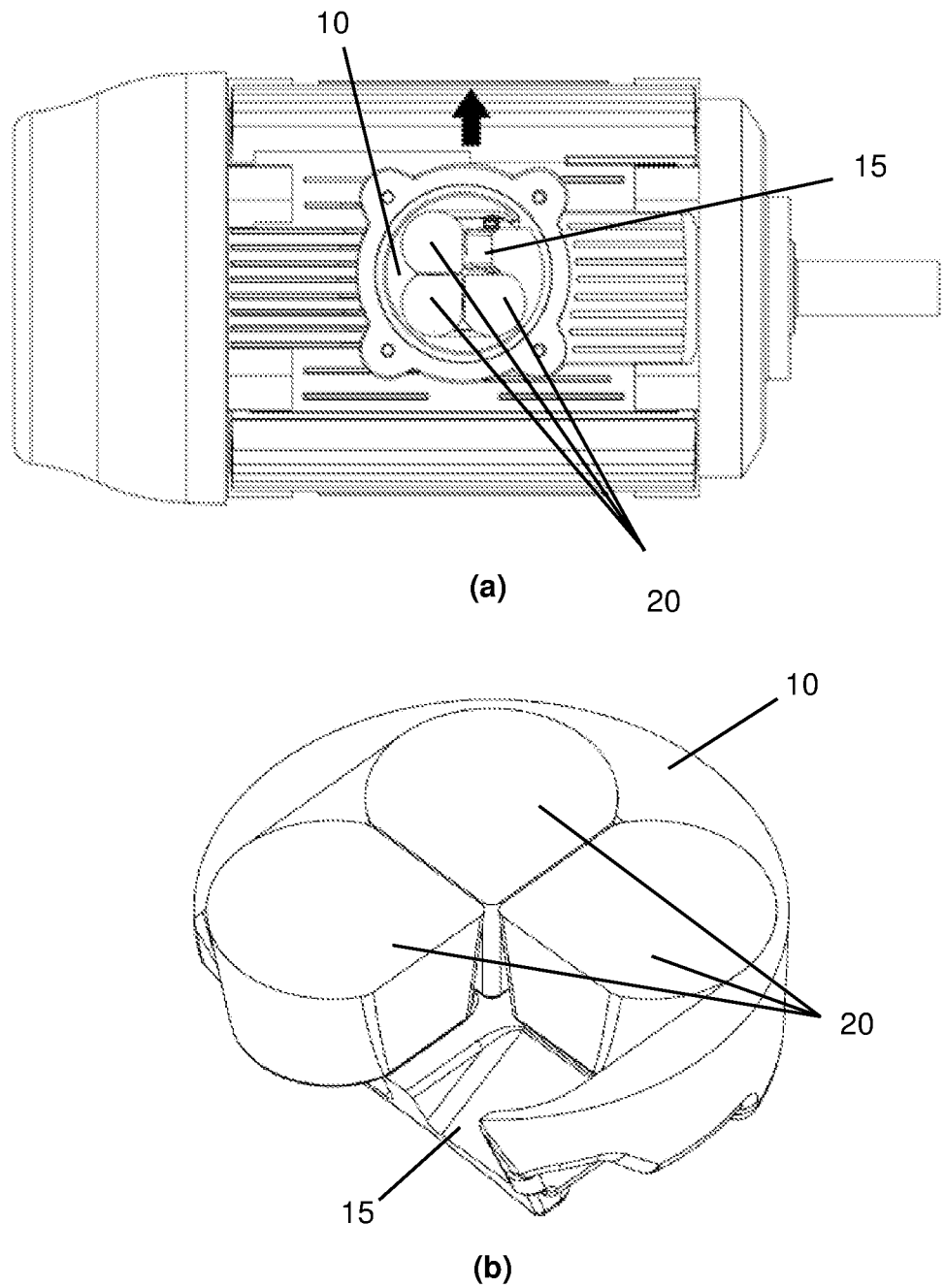
FIG. 8a—is a top view of the internal pressure reducing device according to a preferred embodiment of the present invention, the volume filling device being filled with pieces in a first configuration.
FIG. 8b—is a perspective view of the internal pressure reducing device according to a preferred embodiment of the present invention, the volume filling device being filled with pieces in a first configuration.
Figure 9:
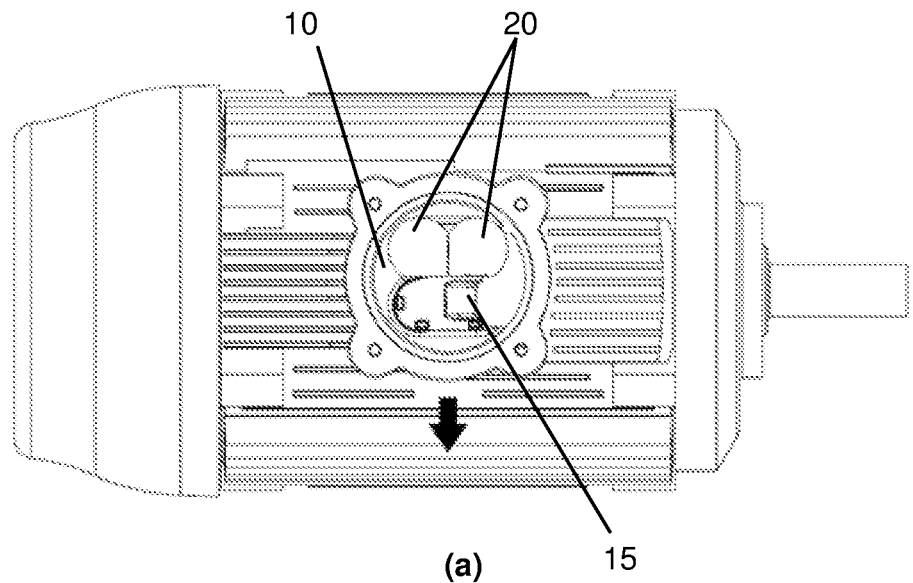
FIG. 9a—is a top view of the internal pressure reducing device according to a preferred embodiment of the present invention, the volume filling device being with filling pieces in a second configuration.
FIG. 9b—is a perspective view of the internal pressure reducing device according to a preferred embodiment of the present invention, the volume filling device being filled with pieces in a second configuration.
Figure 9:
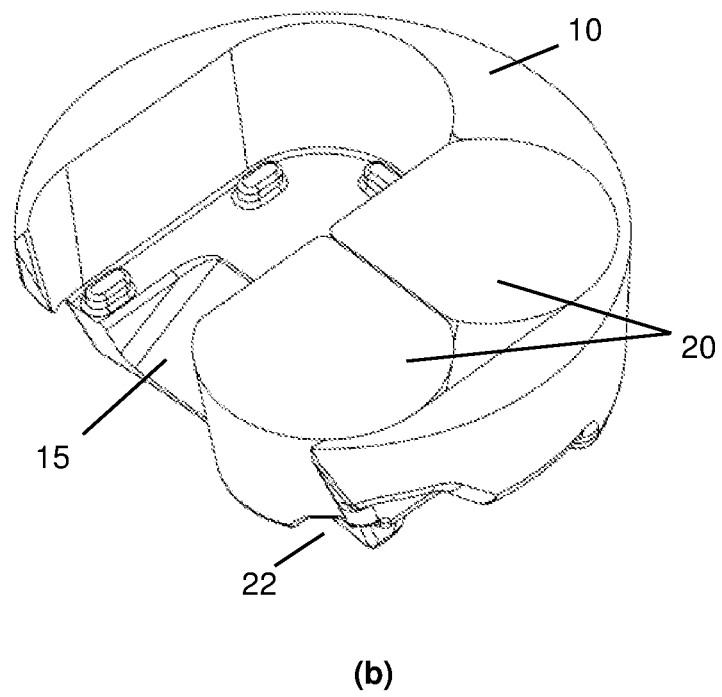
Figure 10:
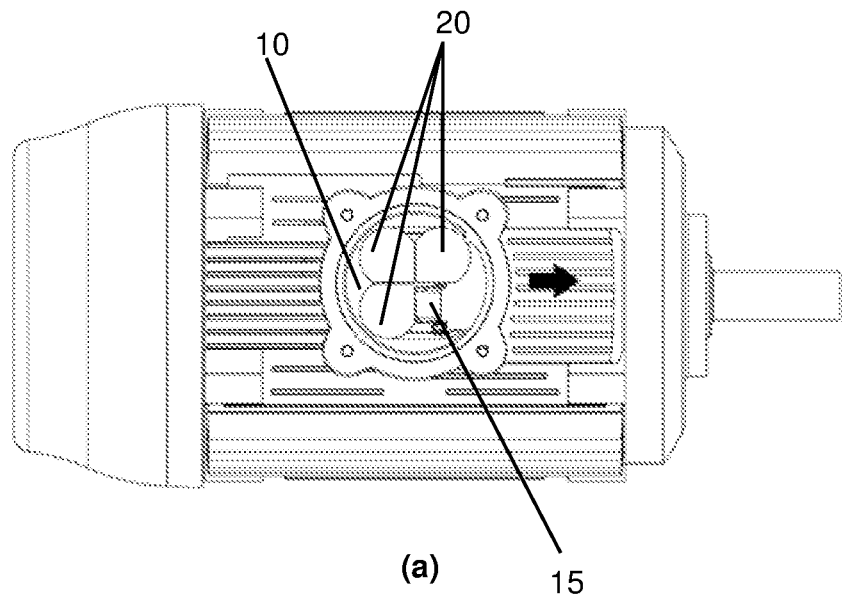
FIG. 10a—is a top view of the internal pressure reducing device according to a preferred embodiment of the present invention, the volume filling device being filled with pieces in a third configuration.
FIG. 10b—is a perspective view of the internal pressure reducing device according to a preferred embodiment of the present invention, the volume filling device being filled with pieces in a third configuration.
Figure 10:
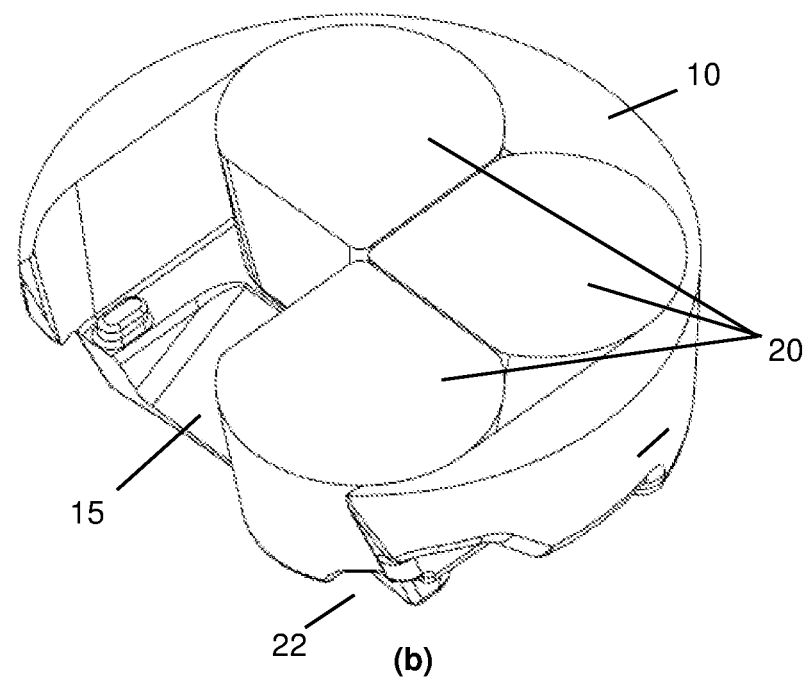
Figure 11:
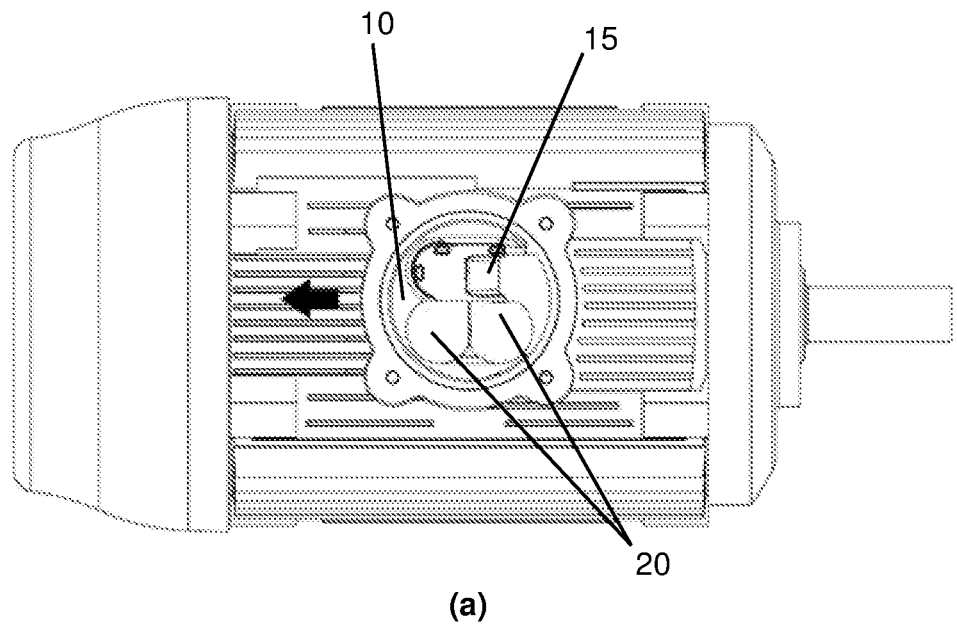
FIG. 11a—is a top view of the internal pressure reducing device according to a preferred embodiment of the present invention, the volume filling device being filled with pieces in a fourth configuration.
FIG. 11b—is a perspective view of the internal pressure reducing device according to a preferred embodiment of the present invention, the volume filling device being filled with pieces in a fourth configuration.
Figure 11:
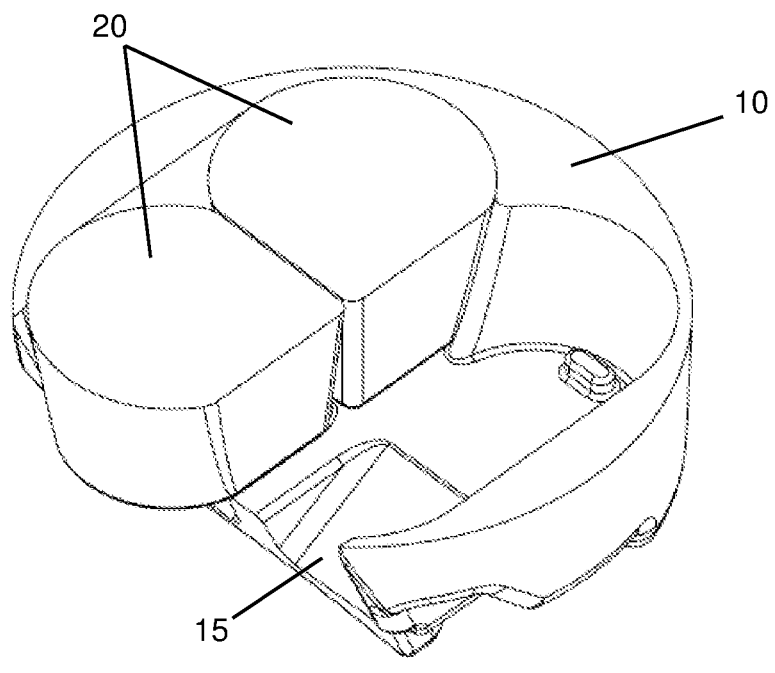
Figure 12:
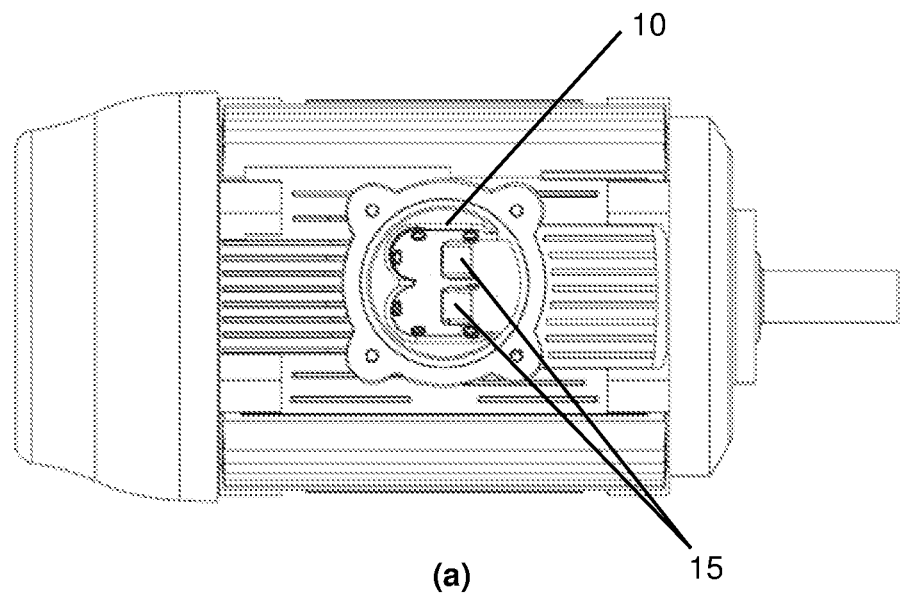
FIG. 12a—is a top view of the internal pressure reducing device according to a preferred embodiment of the present invention, the volume filling device being without filling pieces in a fifth configuration.
FIG. 12b—is a perspective view of the reduction device of internal pressure according to a preferred embodiment of the present invention, the volume filling device being without filling pieces in a fifth configuration.
Figure 12:
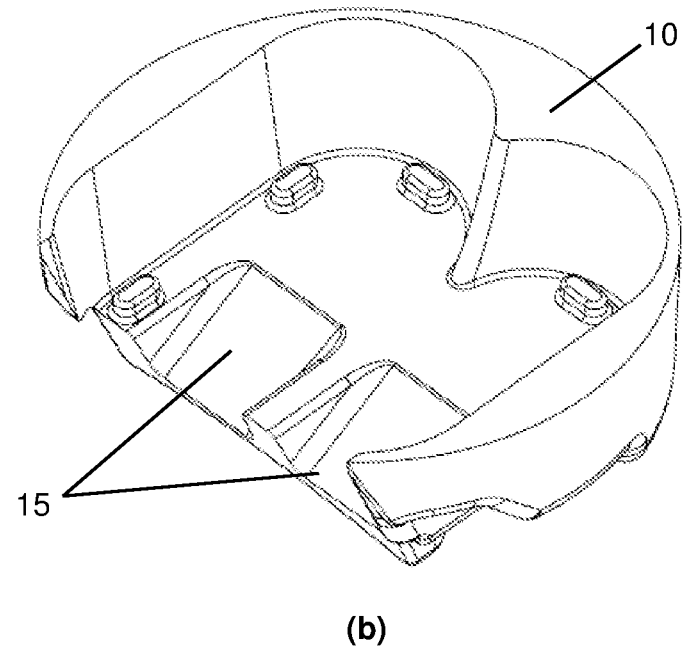

As illustrated in FIGS. 6 and 7, each volume filling piece 20 may also have a recess 22 that cooperates with a stop shoulder in the casing. This stop helps to keep the filling pieces that are close to the opening of the wall 12 of the base 10 in the correct position in relation to the base and the casing (see, for example, FIGS. 9b and 10b).

Figure 5:
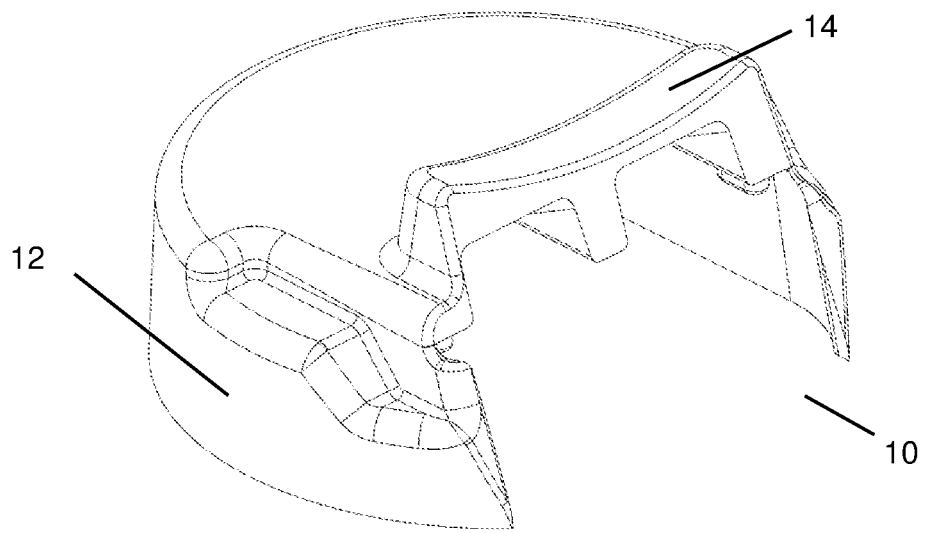
FIG. 5—is a perspective view from the bottom of the base of the internal pressure reducing device according to a preferred embodiment of the present invention.

As best seen in FIGS. 4 and 5, the bottom wall 11 can also comprise an external engaging shoulder 14 that cooperates with a recess in the casing of the electric machine and at least one passage track 15 for passage of cables and electrical connection wires. In the embodiment shown in the figures, the bottom wall 11 has two passages track 15.

Each passage track 15 preferably has the shape of one wall which is tilted to lower the from the surface of the bottom wall 11, so as to create a space for the passage of cables and wires.

Preferably, the passage tracks 15 extend in the direction to part from access the base 10 (that is, in the direction to part from base 10 without the part of wall 12. As shown in FIGS. 4, 5 and 8B).

Each volume filling part 20 preferably comprises a part produced in polymer with a geometry configured to engage the base 10. In a preferred embodiment, the polymeric material is silicone. However, other polymeric or metallic materials could be used.

As best illustrated in FIGS. 6 and 7, preferably the filling parts of the device are all of the same shape, reducing the costs of manufacturing the set and facilitating the replacement of the pieces if necessary.

In the preferred embodiment of the present invention, each filler piece comprises a top wall 23 and a bottom wall 24 substantially parallel, two flat side walls 25 at an approximately right angle to each other and a curved side wall 26 that connects to the two flat walls.

The base 10 has a geometry configured to receive the volume filling pieces 20. Thus, in the embodiment shown in the figures, the part of wall 12 is formed with curved surfaces to accommodate the curved walls 26 of the volume filling pieces 20.

With this configuration, the internal pressure reducing device of the present invention has great versatility, allowing different configurations according to the positioning/rotation of the connection box:

FIGS. 8a and 8b show the pressure reducing device installed in an electrical machine in which the connection box is installed so that the exit of cables is the right of the device (see arrow indicative). As best seen in FIG. 8b, in this configuration the pressure reducing device has three volume filling pieces 20 engaged to the base 10, so that one of the track passages 15 is unfilled.

FIGS. 9a and 9b show the internal pressure reduction device installed in an electrical machine where the connection box is installed so that the cable outlet is on the left of the device (see indicative arrow). As best seen in FIG. 9b, in this configuration the pressure reduction device has two volume filling pieces 20 engaged to the base 10, the left side of the device being without filling pieces.

FIGS. 10a and 10b show the internal pressure reduction device installed in an electrical machine in which the link box is installed in order that the output of cables is the front of the device (see indicating arrow). As best seen in FIG. 10b, in this configuration the pressure reduction device has three parts volume of filler 20 embedded in the base 10, in order that one of the slopes of passage 15 is not filled.

FIGS. 11a and 11b show the internal pressure reduction device installed in an electrical machine where the connection box is installed so that the cable outlet is at the back of the device (see indicative arrow). As best seen in FIG. 11B, in this configuration the pressure reduction device has two parts filling of the volume 20 engaged in the base 10, and that the side right of the device without pieces is completed.

FIGS. 12a and 12b show the internal pressure reduction device installed in an electrical machine where the connection box is installed so that the passage of cables requires more space. As best seen in FIG. 12b, in this configuration the pressure reduction device uses only the base 10 as a volume fill.

Thus, it is clear that the configuration between quantity and position of the volume filling pieces 20 may vary according to the number and gauge of cables present in the engine. Engines with a higher number of cables use smaller quantities of volume filling pieces 20.

In addition, the number of volume filling pieces may be greater than four, and it would be enough for the shape of the pieces to be changed according to the proposed fit in the base.

Having described an example of the preferred embodiment of the present invention, it should be understood that the scope of the present invention encompasses other possible variations of the described inventive concept, being limited only by the content of the claims only, including the possible equivalents therein.

The invention claimed is:

1. An internal pressure reduction device for installation in an explosion proof electric machine having a frame and a connection box fixed to the frame, the internal pressure reduction device comprising: a base for installation in a casing region of the frame below the connection box, the base being configured to receive a plurality of volume filling pieces; wherein the base comprises a bottom part and a part of wall that extends by at least a part of a periphery of the bottom part.

2. The internal pressure reduction device according to claim 1, wherein the base further comprises at least one engaging means for engaging each piece of the plurality of volume filling pieces.

3. The internal pressure reduction device according to claim 2, wherein the bottom part of the base comprising the at least one engaging means; and wherein each of the plurality of volume filling pieces has at least one corresponding engaging means configured for engagement with the at least one engaging means of the bottom part of the base.

4. The internal pressure reduction device according to claim 1, wherein a material of the base is polymeric.

5. The internal pressure reduction device according to claim 1, wherein a material of the base is metal.

6. The internal pressure reduction device according to claim 1, wherein the volume filling pieces of the plurality of filling pieces are identical, and each of the volume filling pieces comprises a polymer injected part.

7. The internal pressure reduction device according to claim 1, wherein the volume filling pieces of the plurality of filling pieces are identical, and each of the volume filling pieces comprises a metallic piece.

8. The internal pressure reduction device according claim 2, wherein the engaging means of the bottom part of the base comprises at least one elongate projection and a corresponding engaging means of each of the plurality of volume filling pieces comprises at least one oblong opening that receives, in an engaging configuration, the at least one oblong projection.

9. The internal pressure reduction device according to claim 1, wherein each of the plurality of volume filling pieces possessed yet one positioning recess that cooperates with one shoulder in the frame of the electrical machine.

10. The internal pressure reduction device according to claim 1, wherein the bottom part of the base further comprises an external engaging shoulder that cooperates with one recess in the in the frame of the electrical machine, and at least one passage track for passage of cables and wires for electrical connection.

11. An explosion proof electric machine having a frame and one a connection box fixed to the frame, wherein a casing region is defined below the connection box, wherein the region of the casing below the connection box is configured to receive the internal pressure reduction device as defined in claim 1.

\* \* \* \* \*